(12) United States Patent
Alberts et al.

(10) Patent No.: US 12,509,096 B2
(45) Date of Patent: Dec. 30, 2025

(54) METHOD FOR OPERATING A MOTOR VEHICLE, AND MOTOR VEHICLE

(71) Applicant: Bayerische Motoren Werke Aktiengesellschaft, Munich (DE)

(72) Inventors: Esther Alberts, Munich (DE); Irmengard Ditzell, Freising (DE); Marcel Ewers, Dachau (DE); Simone Fuchs, Munich (DE); Harald Hofmeier, Eching (DE); Stefan Holder, Munich (DE); Tobias Straub, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 17/912,422

(22) PCT Filed: Mar. 2, 2021

(86) PCT No.: PCT/EP2021/055110
§ 371 (c)(1),
(2) Date: Sep. 16, 2022

(87) PCT Pub. No.: WO2021/185563
PCT Pub. Date: Sep. 23, 2021

(65) Prior Publication Data
US 2023/0134925 A1   May 4, 2023

(30) Foreign Application Priority Data
Mar. 19, 2020 (DE) ..................... 10 2020 107 536.7

(51) Int. Cl.
*B60W 50/00* (2006.01)
*G01C 21/00* (2006.01)
*G07C 5/00* (2006.01)

(52) U.S. Cl.
CPC ..... *B60W 50/0097* (2013.01); *G01C 21/3815* (2020.08); *G01C 21/3841* (2020.08);
(Continued)

(58) Field of Classification Search
CPC ........... G01C 21/3841; G01C 21/3815; B60W 2556/10; B60W 2510/244;
(Continued)

(56) References Cited

U.S. PATENT DOCUMENTS 8,620,506 B2\* 12/2013 Kummer ................. B60L 58/12
                                                                 180/65.21
9,290,108 B2\*  3/2016 Payne ................. G01C 21/3461
(Continued)

FOREIGN PATENT DOCUMENTS

CN    108475465 A    8/2018
CN    110418940 A    11/2019
(Continued)

OTHER PUBLICATIONS

DE-102014004167-A1 machine translation (Year: 2014).\*
(Continued)

*Primary Examiner* — Fadey S. Jabr
*Assistant Examiner* — Mark Robert Heim
(74) *Attorney, Agent, or Firm* — Crowell & Moring LLP

(57) ABSTRACT

A method for operating a motor vehicle. A map of corresponding event locations for one or more high load events is provided, wherein the one or more high load events have historically led to an above-average load on a vehicle component. A current position and/or route of the motor vehicle is determined. A high load event is identified from among the one or more high load events as likely to be relevant to the motor vehicle during the current operation. The identification of the high load event is based on the current position and/or route of the motor vehicle. The
(Continued)

vehicle component is thermally preconditioned, via a corresponding automatic control of at least one device of the motor vehicle, before the motor vehicle has reached the corresponding event location of the identified high load event.

10 Claims, 2 Drawing Sheets

(52) U.S. Cl.
CPC ....... *G07C 5/008* (2013.01); *B60W 2510/244* (2013.01); *B60W 2510/246* (2013.01); *B60W 2520/10* (2013.01); *B60W 2530/10* (2013.01); *B60W 2540/043* (2020.02); *B60W 2540/30* (2013.01); *B60W 2556/10* (2020.02); *B60W 2556/50* (2020.02)

(58) Field of Classification Search
CPC ....... B60W 2510/246; B60W 2520/10; B60W 2530/10; B60W 2556/50; B60W 50/0097; B60W 2540/043; B60W 2540/30; B60W 2050/0075; B60L 2260/56; B60L 2260/54; B60L 2260/50; G07C 5/008
See application file for complete search history.

(56) References Cited

U.S. PATENT DOCUMENTS

| | | | | |
|---|---|---|---|---|
| 9,321,441 | B1* | 4/2016 | Shah | B60T 8/174 |
| 9,446,682 | B2* | 9/2016 | Gauthier | G01C 21/343 |
| 9,810,543 | B2* | 11/2017 | Hoch | G01C 21/343 |
| 10,343,633 | B2* | 7/2019 | Tseng | B60H 1/00778 |
| 10,369,899 | B2* | 8/2019 | Hettrich | B60L 58/27 |
| 10,414,240 | B2* | 9/2019 | Eisele | B60L 1/02 |
| 10,780,885 | B2* | 9/2020 | Marcicki | H01M 10/625 |
| 10,800,287 | B2* | 10/2020 | Vallender | B60L 58/12 |
| 10,870,368 | B2* | 12/2020 | Ing | B60L 58/26 |
| 10,960,785 | B2* | 3/2021 | Villanueva | H01M 10/625 |
| 11,084,398 | B2* | 8/2021 | Marcicki | H01M 10/486 |
| 11,152,653 | B2* | 10/2021 | Carlson | H01M 10/613 |
| 11,577,626 | B2* | 2/2023 | Hettrich | B60L 58/16 |
| 11,654,794 | B1* | 5/2023 | Khattar | B60L 58/16 244/6 |
| 11,777,153 | B2* | 10/2023 | Hermann | H01M 10/4257 429/90 |
| 2007/0159757 | A1* | 7/2007 | Moffatt | H02H 9/044 361/118 |
| 2009/0293522 | A1* | 12/2009 | Miyazaki | B60H 1/3205 62/239 |
| 2010/0235030 | A1* | 9/2010 | Xue | B60L 50/16 180/65.21 |
| 2014/0236466 | A1* | 8/2014 | Doron | G06Q 10/06 701/123 |
| 2014/0277835 | A1* | 9/2014 | Filev | G01C 21/3469 701/2 |
| 2015/0274030 | A1* | 10/2015 | Payne | G01C 21/3461 903/903 |
| 2016/0059733 | A1* | 3/2016 | Hettrich | B60L 58/27 701/2 |
| 2016/0275730 | A1* | 9/2016 | Bonhomme | G08G 1/096775 |
| 2017/0028978 | A1* | 2/2017 | Dunlap | B60W 10/26 |
| 2017/0080821 | A1* | 3/2017 | Hughes | B60L 58/25 |
| 2017/0101030 | A1* | 4/2017 | Hughes | B60R 16/0236 |
| 2018/0072181 | A1* | 3/2018 | Christen | H01M 10/625 |
| 2018/0111486 | A1* | 4/2018 | Kwon | B60K 11/00 |
| 2018/0276485 | A1* | 9/2018 | Heck | G06N 7/01 |
| 2018/0334170 | A1* | 11/2018 | Liu | B60W 10/30 |
| 2018/0356835 | A1* | 12/2018 | Gehring | G05D 1/0217 |
| 2019/0037545 | A1* | 1/2019 | Jiao | H04W 76/30 |
| 2019/0161076 | A1* | 5/2019 | Plianos | B60W 10/04 |
| 2019/0217721 | A1* | 7/2019 | Marcicki | H01M 10/613 |
| 2019/0286079 | A1* | 9/2019 | Zang | B60L 50/50 |
| 2019/0315232 | A1* | 10/2019 | Ing | B60L 58/26 |
| 2019/0339085 | A1* | 11/2019 | Naef | B60W 50/0097 |
| 2020/0280842 | A1* | 9/2020 | Liu | H04L 9/3268 |
| 2020/0317087 | A1* | 10/2020 | Brinkmann | B60K 6/28 |
| 2020/0376927 | A1* | 12/2020 | Rajaie | B60H 1/00764 |
| 2022/0063445 | A1* | 3/2022 | Lee | B60L 58/26 |
| 2023/0099486 | A1* | 3/2023 | Wiese | H01M 10/625 429/62 |
| 2024/0247940 | A1* | 7/2024 | Kotzor | G01C 21/3617 |

FOREIGN PATENT DOCUMENTS

| | | | |
|---|---|---|---|
| DE | 10 2014 008 380 A1 | 12/2014 | |
| DE | 102014004167 A1 * | 10/2015 | ........... B60W 40/06 |
| DE | 102016102618 A1 * | 8/2016 | ........ B60H 1/00742 |
| DE | 10 2018 111 259 A1 | 11/2018 | |
| DE | 102017006158 A1 * | 1/2019 | |
| DE | 102019101688 A1 * | 9/2019 | ............... B60L 3/00 |
| DE | 10 2018 211 424 A1 | 1/2020 | |
| DE | 10 2019 114 370 A1 | 2/2020 | |
| EP | 2 368 751 A2 | 9/2011 | |
| EP | 3254884 A1 * | 12/2017 | ............. B60L 50/60 |
| EP | 3 348 964 A1 | 7/2018 | |
| KR | 10-2019-0042259 A | 4/2019 | |
| WO | WO 2016/200762 A1 | 12/2016 | |

OTHER PUBLICATIONS

DE-102016102618-A1 machine translation (Year: 2016).*
DE-102017006158-A1 machine translation (Year: 2017).*
DE-102019101688-A1 machine translation (Year: 2019).*
PCT/EP2021/055110, International Search Report dated Jun. 1, 2021 (Two (2) pages).
German Search Report issued in German application No. 10 2020 107 536.7 dated Mar. 8, 2021, with Statement of Relevancy (Ten (10) pages).
Chinese-language Office Action issued in Chinese Application No. 202180008944.1 dated Apr. 30, 2025 with English translation (15 pages).

* cited by examiner

METHOD FOR OPERATING A MOTOR VEHICLE, AND MOTOR VEHICLE

CROSS REFERENCE TO RELATED APPLICATION

This application is a 371 of International Application No. PCT/EP2021/055110, filed Mar. 2, 2021 which claims priority under 35 U.S.C. § 119 from German Patent Application No. 10 2020 107 536.7, filed Mar. 19, 2020, the entire disclosure of which is herein expressly incorporated by reference.

BACKGROUND AND SUMMARY OF THE INVENTION

The present invention concerns a method for operating a motor vehicle and a motor vehicle set up for carrying out such a method or for participating in such a method.

Motor vehicles today are complex technical structures with a variety of components, which in turn may exhibit complex characteristics and behaviors. Thus, for example, it is known that various components have a temperature-dependent behavior or temperature-dependent properties. An optimal temperature control of the vehicle components can thus enable improved operation of the motor vehicle on the one hand, but on the other hand is not a trivial task. In view of the technology of today's motor vehicles, which is now far removed from pure mechanics, and in view of the increasing desire for sustainability, further improvements, and optimizations in the operation of motor vehicles are desirable.

As one approach, DE 10 2016 102 618 A1 describes a method and a device for proactive vehicle preconditioning. It is provided to select a planned key on time from a schedule of probable vehicle start times, which has a minimum probability of occurrence based on an observed vehicle usage. If a current vehicle-related temperature justifies vehicle preconditioning, the vehicle is preconditioned until preset preconditioning settings are achieved. This allows the vehicle to be put into a ready-to-drive state before it is put into operation for a start in order to improve a driving experience.

A similar approach is also known from DE 10 2018 111 259 A1, which describes preconditioning for a hybrid electric vehicle. In response to a preconditioning signal that predicts a start time of the vehicle, a battery charge level and an external power signal are monitored. By means of a thermal management system of the vehicle, the temperature of a battery or a cabin of the vehicle should be preconditioned before the start time of the vehicle. This is done according to respective conditioning profiles, the state of charge and according to the external power signal. A power availability of the battery and an external power source are therefore taken into account in order to set a desired state for starting the vehicle.

The object of the present invention is to enable particularly efficient and careful operation of a motor vehicle. This object is achieved according to the invention by the subject matter of the independent claims. Advantageous embodiments and developments of the present invention are specified in the dependent patent claims, in the description and in the figures.

The method according to the invention is used to operate a motor vehicle. In a process step of the method, a map is provided in which spatially resolved high load events are entered, which have led to an above-average load of at least one vehicle component. The map in the present sense can be in particular a digital data record that indicates the high load events and their event locations, that is, positions or coordinates of the locations where the high load events occurred. In this data record, i.e. in the map, the high load events can also be characterized or described, for example, a respective type of high load events can be specified. As with a conventional road map, the map can contain or include data about traffic routes. Likewise, the map for the purposes of the present invention may, for example, be a layer for a digital road map and/or may reference a predetermined, in particular global, coordinate system, so that the data specified or contained in the map can be overlaid with a conventional digital road map.

The provision of the map can, for example, mean or include—complete or partial or sectional—transfer or transmission thereof to a data processing or control device set up to carry out the method, in particular of the motor vehicle. Similarly, providing the map in the sense of the present invention means or includes, for example, the retrieval or loading from a data memory and/or into a data memory, in particular of the data processing or control device of the motor vehicle. As is explained below in more detail, the map can be stored in a data memory outside the vehicle and managed there, for example, by means of an external server device, for example a cloud server, a backend, a data center, or the like.

The high load events entered in the map may in particular represent respective thermal loads of at least one vehicle component, but also, for example, an above-average power demand or power requirement from the vehicle component or by the vehicle component. The vehicle component may be part of the motor vehicle to be operated in accordance with the method or part of another vehicle, as explained in more detail below.

The high load events for the purposes of the present invention are therefore localized, which means spatially and/or temporally limited occurring loads or load peaks when a vehicle drives through a corresponding event location or area of the respective high load event.

The high load events can occur in the past, i.e. recorded or measured, in particular during the operation of the motor vehicle and/or one or more other motor vehicles. Likewise, based on a provided map or provided map data, an energy demand forecast for the motor vehicle or its operation can be created or an energy demand map, which is spatially resolved to provide a forecast—absolute or relative—and/or measured energy demand for the operation of the motor vehicle or a motor vehicle. The predicted energy demand can be simulated or estimated, for example, based on a given model and map data, which, for example, indicate a respective spatially resolved road type and/or a respective slope. For example, the map can be divided into individual route sections or segments for which the respective energy demand is indicated. Likewise, the energy requirement can be entered, for example, as a continuous profile in the map, for example in the manner of a so-called heat map or the like. The energy demand can therefore be indicated for each place in the map. Based on this, the high load events can then be or will be determined, for example, on the basis of a predetermined threshold value for the energy demand, in particular the energy demand within a spatial area of at most a given size. A high load event can then be identified or located in any location where, according to the map or map data, the energy demand there reaches or exceeds the specified threshold value for the energy demand. The provided map, in which the high load events are entered, can correspond to the energy demand map or can be generated from it.

In a further process step of the method according to the invention the current position and/or route is determined during the operation of the motor vehicle. This can be done automatically, for example, on the basis of active navigation and/or by or supported by a satellite-based navigation or positioning system. This determination of the current position or the route currently travelled or followed by the motor vehicle can be carried out here after commissioning, i.e. during the driving operation of the motor vehicle. In particular, it can be carried out once at the start of the journey and/or continuously or regularly repeatedly during the journey, i.e. during the current operation of the motor vehicle. This also applies to the other process steps of the method according to the invention.

In a further process step of the method according to the invention, at least one of the high load events entered in the map that is likely to be relevant to the motor vehicle or to its operation during the current operation, or will become relevant, is determined depending on the determined current position and/or route of the motor vehicle. A high load event can be classified as relevant to the current operation of the motor vehicle if the motor vehicle is likely to reach the corresponding event location, for example with a predetermined minimum probability during the current operation. Similarly, however, there may be other criteria which can be evaluated automatically to determine the relevance or one or more relevant high load events. Such criteria may concern, for example, characteristics or a current or likely condition of the motor vehicle and/or the like, as is explained further below. In other words, a high load event can be classified as relevant to the motor vehicle in the current operation or to the current operation of the motor vehicle if this high load event is likely, i.e. in particular with a predetermined minimum probability, and at least if no appropriate countermeasures will be taken or carried out during the current operation of the motor vehicle.

The current operation can refer to or include, for example, a current trip or an operating time until the next shutdown or until reaching a given navigation destination and/or the like.

In a further process step of the method according to the invention, an automatic thermal preconditioning of the vehicle component with an above average load during at least one determined relevant high load event is carried out by automatically controlling at least one device of the motor vehicle before the motor vehicle reaches the event location of the corresponding high load event. In other words, the at least one vehicle component is automatically prepared for the high load event as the motor vehicle approaches the corresponding event location. As a result, it can be achieved that on reaching the event location, the vehicle component is conditioned or preconditioned accordingly, in particular temperature-controlled, to be able to pass through the high load event or the corresponding event location particularly efficiently and/or carefully.

High load events can be of various kinds and affect different components, for example by a particularly high drive load or demand or power load or demand, a particularly high charging load, a particularly high climatic load due to environmental conditions and/or the like. The latter can therefore mean, for example, a particularly high thermal load due to correspondingly extreme outside temperatures or direct sunlight. Likewise, for example, an air conditioning or temperature control demand by a user for an interior of the motor vehicle can lead to a high load event or constitute a high load event. Accordingly, the above averagely loaded vehicle component can, for example, be a traction battery, a transmission, a drive, a brake system, an air conditioning device, a pump, a charging device of the motor vehicle and/or the like. At least some of those components may have their own temperature control or air conditioning device, which can then be automatically controlled for the thermal preconditioning of the corresponding device. Accordingly, the device controlled for thermal preconditioning may correspond to the vehicle component or be part of the vehicle component.

However, the controlled device may also be different from the vehicle component to be thermally preconditioned. For example, the device may be an electrical consumer of the motor vehicle. By appropriate control of this device or this electrical consumer, for example, its power requirement can be reduced, whereby the battery of the motor vehicle, its alternator and/or an electrical supply line through which the electrical consumer is supplied, is correspondingly less loaded. As a result, these vehicle components or other vehicle components located in their immediate vicinity can be exposed to correspondingly less thermal power dissipation, which is effective for setting a certain temperature of these vehicle components, i.e. can lead to or contribute to their thermal preconditioning. Analogously, at least one vehicle component can also be heated for thermal preconditioning by the targeted increase of a power demand or energy consumption of a device of the motor vehicle.

The present invention thus enables proactive thermal conditioning of vehicle components, so that an optimal operating temperature of the vehicle components is set more accurately and reliably than before even during the operation of the motor vehicle or excessive thermal loads or reaching a temperature threshold specified for safe operation is avoided, or at least can be reduced compared to conventionally operated motor vehicles. Thus, corresponding adverse effects or consequences, such as temperature-dependent wear, temperature-dependent noise emission or limited power availability, can be reduced and improved driving comfort may be achieved, if appropriate. Advantageously, this can be achieved by the proactive control provided according to the invention with reduced power or reduced power consumption compared to conventionally powered motor vehicles. This advantageously enables an overall more energy-efficient and careful operation of the motor vehicle. For example, cooling can be carried out proactively over a longer period of time, so that, for example, a reduced fan revolution rate can be used for the respective high load event to achieve an optimal operating temperature of the respective vehicle component at the event location. As a result, for example, the sudden switching on of a fan with maximum power and correspondingly maximum sound volume, which can sometimes be observed nowadays, can be advantageously avoided.

The thermal preconditioning can be particularly advantageously implemented by the present invention both with active navigation and without active navigation of the motor vehicle and is therefore always or permanently available during the operation of the motor vehicle. As a result, a design of temperature control or air conditioning devices of the motor vehicle can be advantageously adapted, for example. In particular, a smaller or less powerful design is possible because as a result of the proactive control a less spontaneous power demand exists or arises, i.e. demand peaks or power peaks for temperature control or air conditioning can be avoided. As a result, both resources during production and weight can be advantageously saved, which ultimately also enables more efficient and more careful operation of the motor vehicle.

For the high load events entered in the map, a respective probability can be determined for their occurrence during the current operation of the motor vehicle. If, for example, there are several corresponding event locations along the current route or within a predetermined radius around the current position of the motor vehicle, the control or the thermal preconditioning can be performed according to the high load event with the highest probability. Particularly preferably, one or more probability thresholds may be specified. The thermal preconditioning or the corresponding control of the at the least one device can then be automatically caused once the probability of the occurrence of one of the high load events reaches or exceeds the specified probability threshold. Particularly preferably, different probability thresholds for different control measures or control interventions may be specified. These can, for example, be graduated according to a respective energy demand of the various control measures. Thus, a less energy-intensive control measure can be started when a first probability threshold is reached, while a comparatively more energy-intensive second control measure is only started when a higher second probability threshold is first reached. In this way, a beneficial compromise can be realized between a time available for thermal preconditioning and an energy or power requirement for the control of the at least one device if there is uncertainty as to whether or when a particular high load event will occur during the current operation of the motor vehicle or which high load event will occur during the current operation of the motor vehicle.

The map with the high load events entered therein can be specified, i.e. can be provided as the input data or recorded or retrieved for carrying out the method according to the invention. Likewise, the generation of the map, i.e. a spatially resolved recording of high load events and their aggregation, i.e. collecting or bundling, in the map can be part of the method according to the invention, so can be carried out in a further process step of the method according to the invention, in particular automatically.

Likewise, optionally as part of the method according to the invention, the map can be automatically updated, for example on the basis of data from the motor vehicle collected or recorded during its operation, in particular in the area of the respective event location. Particular preferably, therefore during a thermally preconditioned passage through the respective event location by the motor vehicle, a load on or a temperature of the at least one vehicle component can be monitored. According to corresponding recorded temperature or monitoring data, a check of the control or the measures carried out for the thermal preconditioning can be automatically carried out to determine whether they have led to a predetermined result. Such a predetermined result or goal may, for example, be or include that the temperature of the vehicle component does not reach a specified temperature threshold during the high load event or, for example, moves within a specified temperature range. If necessary, a strategy or measure used or deployed for the respective high load event for the control of the facility or the thermal preconditioning of the vehicle component can be adapted. In this way, the vehicle control can be iteratively optimized specifically for individual high load events at certain event locations.

A corresponding strategy or corresponding information or additional information, which can be used or taken into account in the control of at least one device for thermal preconditioning of the at least one vehicle component can also be entered in the map or the corresponding data record. Thus, these data or this information can be advantageously used not only for the motor vehicle, but also for the thermal preconditioning of vehicle components of other vehicles.

In an advantageous development of the present invention, the map is or will be generated based on fleet data that indicate high load events detected by a large number of fleet vehicles during their own operation. In other words, corresponding data from different vehicles in a corresponding vehicle fleet are aggregated, i.e. consolidated, in a common data record, namely in the map. As a result, the map can advantageously achieve a sufficient coverage or data base for practicable applications in a particularly simple, fast, and low-effort manner. In particular, the fleet vehicles may be private customer vehicles used in their regular operation, so that advantageously on the one hand no additional vehicles are used to create the map, i.e. must be diverted or made available specifically for this purpose, and on the other hand the recorded high load events are advantageously recorded under regular operating conditions, which are also to be expected for the motor vehicle.

The fleet data may preferably also contain vehicle-specific characteristics or current status data of the respective fleet vehicle during and/or before the respective high load event. For example, the fleet data may include a respective speed, acceleration and/or deceleration, a setting of the air conditioning, a charging status, a battery status, a current total energy consumption, a route traveled to the event location of the respective high load event, a time stamp or time history of these and/or other data and the like. Based on these fleet data, predefined evaluations or calculations can then be carried out if necessary, for example to determine respective probabilities, average values, extreme values, divergence probabilities, dependencies of one or more variables or states on each other and/or on a time of day or season or weather or environmental conditions and/or similar matters. These data or corresponding results can also be entered in the map. Thus, a more accurate and reliable determination of high load events relevant to the respective motor vehicle during its current operation and, if appropriate, a particularly effective or particularly efficient control for the thermal preconditioning can be advantageously achieved.

In an advantageous development of the present invention, the proportion of fleet vehicles that have passed through the respective event location without the occurrence of a high load event there is also recorded as part of the fleet data for the event locations. Based on this, the high load events are given a respective probability for their occurrence. This can be done in particular depending on a driving history of the respective fleet vehicle preceding the passage through the respective event location. The driving history can indicate, for example, on which section or along which route or after which operating time or even which driving or operating condition and/or the like the respective event location has been reached by the respective fleet vehicle. The determination and consideration of a probability proposed here may advantageously allow a particularly flexible consideration of possibly several high load events detected, i.e. potentially occurring, along the route or in the vicinity of the motor vehicle. In such a situation, it is thus possible to automatically react correctly for the respective operation of the motor vehicle, at least on average.

In a further advantageous embodiment of the present invention, for generating the map for at least one vehicle, a route traveled by the vehicle is recorded. This may be carried out, for example, for the aforementioned fleet vehicles. The recording of the route can be carried out continuously or permanently, in particular independently of previous or expected high load events. Upon detection of a high load event by the respective vehicle, at least one segment of the recorded route travelled by this vehicle before the occurrence of the respective high load event is assigned a classification number in the map. This classification number indicates that the respective segment leads to an event location of a high load event. The classification number can be determined or defined in particular distance-dependently, i.e. depending on a distance of the respective segment from the respective event location. Segments further from the event location can accordingly be assigned a smaller classification number than segments closer to the event location or a segment encompassing the event location. Such classification numbers are then used in the operation of the motor vehicle as a basis for determining at least one high load event that is likely to be relevant to the motor vehicle. To this end, in particular, it can be determined in which segment the motor vehicle is currently moving or located and which segment or segments are adjacent to it, in particular in the direction of travel of the motor vehicle. In this sense, a segment of a route can, for example, correspond to a road section between two intersections, branches, exits or the like.

The classification number assigned here can be an absolute value, i.e. a number, for example. The classification number can be increased for a specific segment, for example by 1 each time this segment has been driven by a vehicle before a high load event has been detected in the operation of that vehicle. Likewise, the classification number can be a relative value. For example, the classification number can indicate a proportion of vehicles that have detected the or a high load event during or after driving in the respective segment. Likewise, the classification number can indicate a probability that a or the high load event will occur during or after driving in this segment by a vehicle or the motor vehicle during the current operation. This can preferably be determined on the basis of corresponding fleet data, whereby the classification number can advantageously be determined particularly accurately and reliably.

If, for example, during its operation the motor vehicle is located in a certain segment to which a classification number has been assigned, then this classification number can be used as a measure or probability that a detected high load event, in particular detected along the segment or a typical route encompassing the segment, in particular the closest high load event, will occur during the current operation of the motor vehicle.

Due to the classification numbers or to assigning them segment by segment, the map can be generated similarly to a so-called heat map. As a result, there can advantageously be a current probability or a current measure at each position of the motor vehicle for predicting the occurrence of a high load event during the current operation of the motor vehicle. Advantageously, this can thus be done particularly easily and with particularly little computing effort as well as particularly reliably, since, for example, neither does navigation need to be active during the operation of the motor vehicle nor does it necessarily require the prediction of a most probable path (MPP).

In an advantageous development of the present invention it is provided in the event that a segment is part of routes leading to different event locations, a separate classification number is assigned to the respective segment for each corresponding high load event. In other words, a segment may have several classification numbers assigned to it that represent a measure or probability for the occurrence of different high load events that are associated with different event locations on the segment or in an environment of the segment. This can advantageously enable particularly accurate and reliable determination of high load events relevant to the motor vehicle during its respective operation on the respective segment. Likewise, as a result optimized control of the at least one device for the thermal preconditioning can be advantageously made possible. For example, if two different classification numbers for different high load events with different requirements for thermal preconditioning can be specified for a segment, then depending on the classification numbers or corresponding probabilities of the different high load events, for example, a balanced control or preconditioning between the two requirements can be carried out or provided. This can be done at least if both probabilities or classification numbers differ at most by a given value and/or are below a specified threshold. As a result, depending on which segment the vehicle will be driving next, and thus how the classification numbers or probabilities for the different high load events develop during the current operation of the motor vehicle, then responding particularly quickly and flexibly, the control or thermal preconditioning can thus be adapted to the high load event which is more likely or has the higher classification number. As a result, a particularly efficient and careful operation of the motor vehicle is also advantageously enabled in situations in which there are multiple event locations of detected high load events in a current environment of the motor vehicle or along its current route.

It is also possible that all corresponding high load events individually increase the single classification number of respective segments leading to the respective event location. It may also be provided that the respective classification number is reduced by 1 due to high load events which typically require a vehicle component, for example, while high load events which typically require heating up a vehicle component reduce the classification number by 1, for example. Thus, the classification number of a segment can therefore be positive or negative, which makes it particularly simple and easy to determine which type of control or measures are or are likely to be necessary in each case. It may also be provided that the classification number is determined depending on an intensity or a typical time or power requirement of the thermal preconditioning for the respective high load event. High load events that are particularly intense, i.e. that place particularly high demands on the thermal preconditioning for example, can accordingly represent or take into account a higher classification number or a larger change, i.e. an increase or decrease, in the classification number of a segment. As a result, in other words, not only a spatial proximity or a number of high load events in an environment of the respective segment, but also their type or properties can be directly coded and represented in the respective classification number. Also in this way a particularly accurate and reliable response can be advantageously made particularly simply and easily, for example with a particularly low data volume to be transmitted or to be processed during the operation of the motor vehicle.

In a further advantageous embodiment of the present invention, for the case in which no automatic navigation is active during the operation of the motor vehicle, for high load events located in a specified radius around the current position of the motor vehicle a respective probability for their passage by the motor vehicle during its current operation is determined. Automatic navigation is for the purposes of the present invention device-based or device-supported navigation, for example by a navigation device or a navigation system of the respective motor vehicle. The thermal preconditioning or the corresponding control of the at least one device of the motor vehicle is then carried out on the basis of the high load event with the highest probability. In this case, therefore, no guided navigation of the motor vehicle to a given destination by means of a navigation system or the like is active, so that there is no known route, along which the motor vehicle is guided. Instead of taking into account high load events along such a route, corresponding event locations in the vicinity of the motor vehicle are therefore determined in the present case. All high load events located in the specified environment of the motor vehicle can be classified as relevant to the respective operation of the motor vehicle. This may be done at least subject to one or more other criteria as mentioned elsewhere in the present case. The probability of the high load events can, for example, be entered in the map as described or, in accordance with a given regulation, can be determined or calculated individually for the respective motor vehicle, the respective driver thereof, the respective position of the motor vehicle, the respective operation or operating condition of the motor vehicle and/or the like. For example, it can be taken into account whether a certain high load event is located on a busy or little-used road or a road previously travelled by the respective motor vehicle or, for example, in the direction of travel or against a direction of travel of the motor vehicle and/or the like. By taking into account the probabilities, the control of the at least one device or the thermal preconditioning of the at least one vehicle component can advantageously be carried out for a high load event actually occurring during the respective operation of the motor vehicle with a particularly reliably correct reaction at least on average across many situations and/or motor vehicles.

In a further advantageous embodiment of the present invention, the map is managed by a central server device external to the vehicle. This can be, for example, the server device mentioned elsewhere. When determining the at least one likely related event, vehicle-specific data of the respective motor vehicle, which are not transmitted to the central server device, are also taken into account. Such vehicle-specific data may in particular indicate or concern a current state of charge, a current operating mode, a current component temperature and/or technical equipment of the respective motor vehicle. The operating mode can indicate, for example, whether a sport mode or an eco mode is currently active, which driver assistance system(s) of the motor vehicle, such as cruise control or automatic distance control are in use, and/or whether the motor vehicle is being used in a purely manual, assisted, semi-autonomous or fully autonomous mode and/or the like. In other words, data managed or provided outside the vehicle, in particular the map, can be combined or merged with local data, i.e. data in particular only available or known in the respective motor vehicle. As a result, it is possible to determine particularly accurately and reliably for the respective motor vehicle which high load event(s) are actually relevant to this motor vehicle. For example, a particular high load event noted on the map may occur or be expected only if the motor vehicle is driven to the corresponding event location in manual mode in a sport mode, but not if the motor vehicle is driven to the corresponding event location autonomously or semi-autonomously in an eco-mode. In this way, the thermal preconditioning can therefore be optimized individually for the vehicle, i.e. only when required or in accordance with an actual need of the motor vehicle. This may advantageously lead to or contribute to further improved efficiency and more careful operation of the motor vehicle.

In a further advantageous embodiment of the present invention, the at least one probably relevant event and/or a probability of its occurrence or relevance are determined during the current operation of the motor vehicle depending on the driver-specific characteristics of a driver of the motor vehicle. Such driver-specific characteristics, i.e. corresponding driver data, can in particular indicate or concern a type of driver and/or an automatically learned behavior of the driver. As driver types, for example, sporty or dynamic drivers can be distinguished from moderate or average drivers and/or from less dynamic or slow or reserved drivers. In other words, a driver model can be taken into account which is preferably learned automatically, i.e. can be formed, in particular dynamically adapted, automatically during operation of the vehicle by the driver depending on their behavior, driving style and/or habits. By taking into account such a driver model, i.e. the respective driver-specific characteristics, it can advantageously be determined particularly accurately and reliably whether a certain high load event is likely to be is relevant or not to the respective motor vehicle in combination with the respective driver. This thus advantageously enables further improved, individually optimized operation of the motor vehicle. As described, the driver-specific characteristics can preferably be managed locally by the motor vehicle or in the motor vehicle, i.e. in particular not transmitted to the central server device outside the vehicle. This advantageously enables taking into account the driver's individual characteristics without endangering his privacy, i.e. with particularly simple compliance with corresponding data protection regulations. At the same time, the map can be advantageously used in a single version for a large number of motor vehicles, which can minimize the corresponding administrative burden.

It may also be advantageously possible to record the mentioned vehicle-specific and/or driver-specific data or properties for generating the map together with the high load events and their event locations and to enter or annotate them in the map. As a result, the map can advantageously characterize the high load events in particular detail, so that their respective relevance can be determined particularly accurately and reliably based on the map. For example, to determine relevant high load events, associated vehicle-specific and/or driver-specific data or characteristics are compared with the vehicle-specific and/or driver-specific data or characteristics of the motor vehicle. As a result, computing effort can be advantageously saved on the part of the motor vehicle.

In a further advantageous embodiment of the present invention, the high load events are classified according to their respective occurrence and/or a previously indicated operating state, in particular a speed and/or a load, of the vehicles during the operation of which the high load events were detected. For each assigned class or classification, a control measure to be carried out for the thermal preconditioning is then specified. This control measure can also be entered in the map, i.e. can be part of the corresponding map data. During the operation of the motor vehicle, the control measure specified for the at least one high load event classified as relevant is then automatically carried out for the thermal preconditioning. Likewise, the current operating state of the motor vehicle can first be compared with the corresponding class or classification in order to determine or check the relevance of the respective high load events. On the basis of the operating states, different types or classes of high load events can be identified here. High load events of the same class or classification can therefore occur grouped in a corresponding diagram or characteristic map. For example, different high load events of the same class can lead to an above-average thermal stress on the same vehicle component and/or occur with a similar time history, profile and/or peak value or the like. Accordingly, the same control measure can be assigned to each of the high load events in a class. As a result, the control of the corresponding at least one device or the thermal preconditioning of the at least one vehicle component can be advantageously carried out particularly consistently and with foreseeable success, wherein in addition the effort on the part of the motor vehicle to determine a suitable control measure can be reduced. In particular, if the map is generated based on fleet data, optimal control measures can be advantageously identified in this way and accordingly are then carried out automatically without further effort by each motor vehicle using the method. For example, it can be detected that a high load event in a certain operating state or operating state range always or typically leads to an above-average thermal load of a certain vehicle component and/or that a thermal absorption capacity, heat dissipation capacity or heat conductivity of a given component represents a bottleneck for the temperature control of another vehicle component or a particularly efficient or careful operation of the motor vehicle. In particular, this may affect vehicle components for which no separate temperature sensor is provided, such as a shaft or axle or a bearing or the like.

Another aspect of the present invention is a motor vehicle having a tracking device for determining a current position and/or route of the motor vehicle. Furthermore, the motor vehicle according to the invention has at least one data interface for recording event data which indicate spatially resolved. High load events that in the past have led to an above average, in particular thermal, load on at least one vehicle component. Furthermore, the motor vehicle according to the invention has a control device connected to this data interface for controlling at least one device of the motor vehicle for thermal preconditioning at least one vehicle component, in particular the corresponding above-averagely loaded vehicle component of the motor vehicle. The motor vehicle according to the invention is set up for, in particular automatic, performance of at least one variant or embodiment of the method according to the invention. The motor vehicle according to the invention can therefore in particular be the motor vehicle mentioned in connection with the method according to the invention. Accordingly, the motor vehicle according to the invention may have some or all of the properties and/or parts or components described in connection with the method according to the invention. The control device may in particular have a computer-readable data memory and a processor device connected to it. A computer program executable by the processor device, which encodes or represents the process steps or measures of the method according to the invention or corresponding control instructions, may then preferably be stored on the data memory. The execution of this computer program by the processor device can therefore bring about or cause the automatic performance of the corresponding method. The event data can be recorded via the interface of the vehicle's own devices or components. Likewise, the event data, in particular a corresponding map or corresponding map data, can be recorded, therefore received, via the data interface from a device outside the vehicle, in particular from the aforementioned central server device outside the vehicle.

The data memory and/or the control device, if appropriate in combination with the data interface, may in turn be individual aspects of the present invention.

Further features of the invention may result from the claims, the figures, and the description of the figures. The features and combinations of features mentioned above in the description as well as those below in the description of the figures and/or features and combinations of features shown in the figures alone can be used not only in the specified combination, but also in other combinations or on their own, without departing from the scope of the invention.

BRIEF DESCRIPTION OF THE DRAWINGS

FIG. 1 shows an exemplary process diagram 10 of the method for illustrating a method for operating a motor vehicle 44 (see FIGS. 3 to 5) with regard to thermal preconditioning. First, input data 12 are collected and recorded. The input data 12 can, for example, include conventional geometric or geographic map data 14. The map data 14 can indicate a road network 34 (see FIG. 2), i.e. routes of roads or traffic routes, as well as, for example, gradients, segments, road types, positions, and types of points of interest (PoI), charging stations, petrol stations and/or the like.

Figure 1:
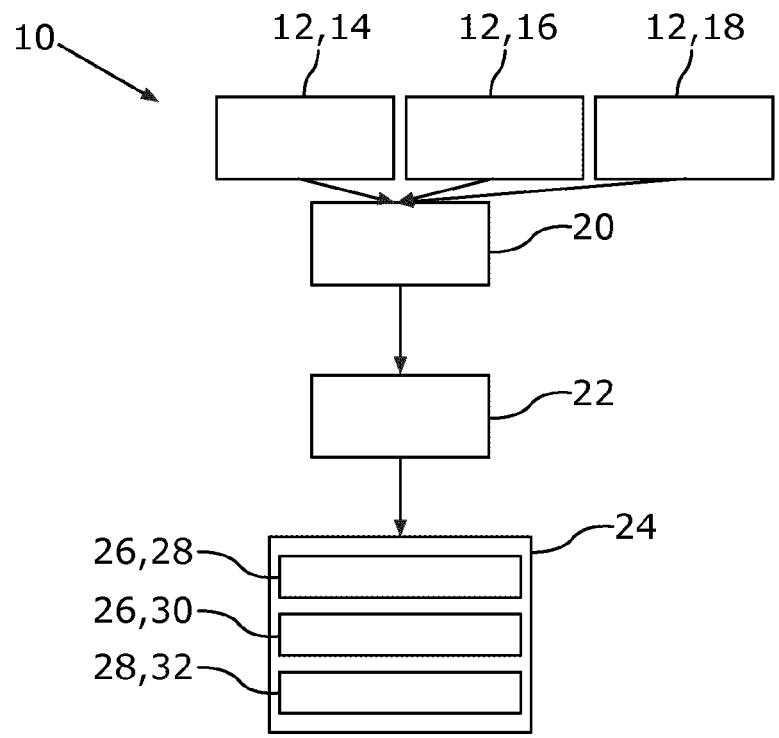
FIG. 1 shows a schematic overview for illustrating a method for operating a motor vehicle.
Figure 2:
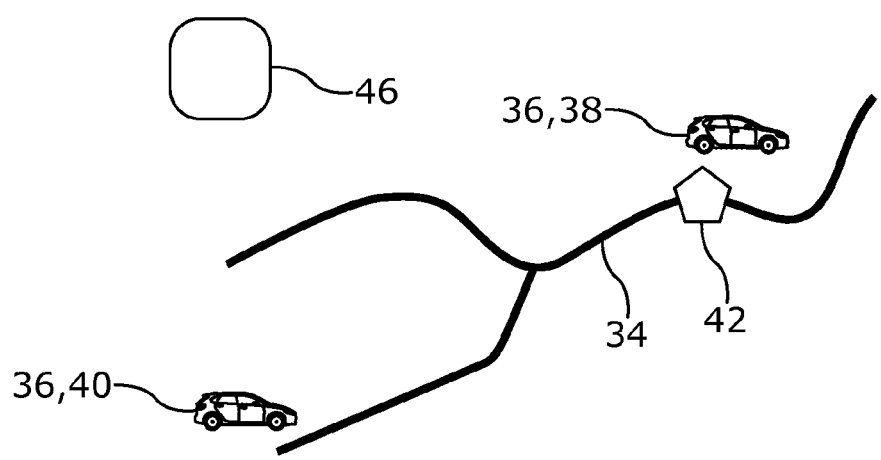
FIG. 2 shows a schematic overview for illustrating a map generation for the method.

Likewise, the input data 12 may include fleet data 16, which can be obtained by a vehicle fleet 36 (see FIG. 2). The fleet data 16 can for example, represent spatially resolved operating states of vehicles of the vehicle fleet 36, high load events 42 detected during their operation (see FIGS. 2 to 5), accelerations, decelerations, settings of an air conditioning system when charging, energy consumption, a probability of divergence, a state of charge or fuel level, habits or behaviors of a particular driver, a payment system used for charging or refueling and/or the like.

Likewise, the input data 12 may include vehicle data 18 for the motor vehicle to be operated 44 or the driver thereof. The vehicle data 18 can, for example, include or indicate a destination input for a navigation system, a current route 48 or a position of the motor vehicle 44, its charging behavior, destinations or routes learned for the motor vehicle 44 or its driver, equipment with driver assistance systems and/or their use or condition and/or the like.

On the basis of the input data 12, an event determination 20 is then carried out, in which high load events relevant to the motor vehicle 44 during its current operation 42 are determined. For this purpose, in particular on the basis of map data 14 and fleet data 16, a map can first be generated in which the high load events 42 and, where appropriate, other related or characterizing data are entered.

On the basis of the vehicle data 18 and this map, the likely relevant high load events 42 for the specific motor vehicle 44 can be determined or selected from all the high load events entered therein.

This map-based determination of at least one high load event 42 relevant to the individual motor vehicle 44 can be understood as an event radar. By means of the event radar, starting from the current position of the motor vehicle 44 high load events 42 can be determined or detected similarly to a conventional radar, but map-based or data-based—graphically by scanning the map starting from the position of the motor vehicle 44 or along its current Route 48.

Based on the at least one high load event 42 identified as relevant, in particular the next high load event 42 or that which is likely to occur next, a strategy 22 for control of at least one device 24 of the motor vehicle 44 or for thermal preconditioning of at least one vehicle component 26 of the motor vehicle 44 is then determined, i.e. defined or selected.

Before the motor vehicle 44 has reached the event location of the corresponding high load event 42, i.e. while approaching that event location, the corresponding device 24 is controlled or actuated for proactive temperature control, i.e. for thermal preconditioning, according to the strategy 22. As a result, the vehicle components 26 are proactively temperature controlled during the operation of the motor vehicle 44 for the corresponding high load event 42, so that they have an optimized or adjusted temperature once the motor vehicle 44 reaches the event location of the corresponding high load event 42. The vehicle components 26 may be or include, for example, a drive 28, a high-voltage system 30 and/or an interior 32 of the motor vehicle 44.

If, for example, the corresponding event location is located on a long and steep incline and the ambient temperature there or a current component temperature of the motor vehicle 44 is above a specified threshold value, for example, the drive 28 and/or the high-voltage system can be proactively cooled in order to avoid or delay their overheating or degradation when driving on the incline. If, for example, the high load event 42 includes a prolonged vehicle standstill under intense sunlight, the interior 32 can be proactively cooled in order to avoid or delay reaching an upper comfort temperature threshold in the interior 32 during the vehicle standstill, so that during the vehicle standstill, for example, a ventilation system or an air conditioning device of the motor vehicle 44 does not have to be activated or only has to be activated later and/or with reduced power to ensure passenger comfort. If, on the other hand, the relevant high load event 42 was, for example, fast charging of a traction battery of the motor vehicle 44, this traction battery can, for example, be heated slowly to enable particularly efficient fast charging.

FIG. 2 shows a schematic overview representation for illustrating generation of the map. For this purpose, a road network 34 is traveled by vehicles of the vehicle fleet 36, which is illustrated here by a first fleet vehicle 38 and a second fleet vehicle 40. By way of example, during the operation of the first fleet vehicle 38, a high load event 42 occurs at a certain point on the road network 34. This is then transmitted by the first fleet vehicle 38 to a server 46 outside of the vehicle, which is schematically indicated here and which bundles the corresponding data of all the vehicles in the vehicle fleet 36. It can also be detected if, for example, the second fleet vehicle 40 passes the event location of the high load event 42 without experiencing the high load event 42 itself.

Figure 3:
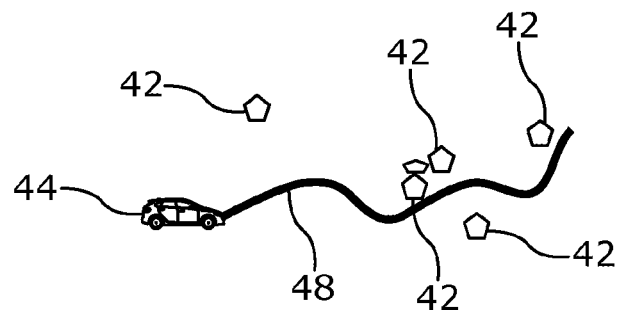
FIG. 3 shows a schematic overview for illustrating a first variant of the method

FIG. 3 shows a schematic overview for illustrating a first variant of the method. Here a current route 48 of the motor vehicle 44 is known. The route 48 can, for example, be defined by a navigation system or can be a route learnt for the motor vehicle 44 or its driver, or an automatically determined most likely route. The route 48 is compared with the map, which includes a variety of high load events 42, to determine which of the high load events 42 lie along the route 48 of the motor vehicle 44 and are therefore at least potentially or likely to be relevant to it.

Figure 4:
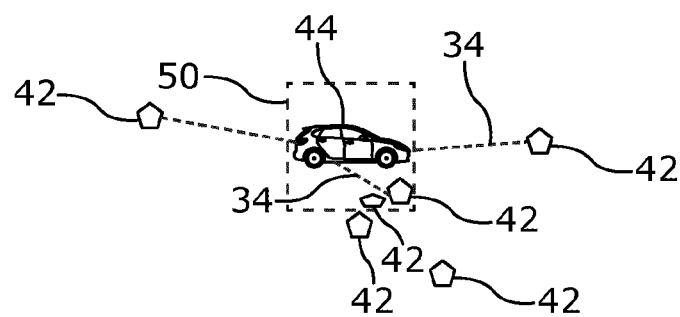
FIG. 4 shows a schematic overview for illustrating a second variant of the method.

FIG. 4 shows a schematic overview for illustrating a second variant of the method. Here the current route 48 of the motor vehicle 44 is not known. Instead, the current position of the motor vehicle 44 is determined and those of the high load events 42 which are located within a given environment 50 around the current position of the motor vehicle 44 are then determined by comparison with the map. High load events 42 located within the environment 50 can then be classified as relevant, while high load events 42 outside the environment 50 can be disregarded. The environment 50 can be carried along with the current position of the motor vehicle 44 while this is moving, so that over time different high load events 42 can be located inside and outside the environment 50.

Figure 5:
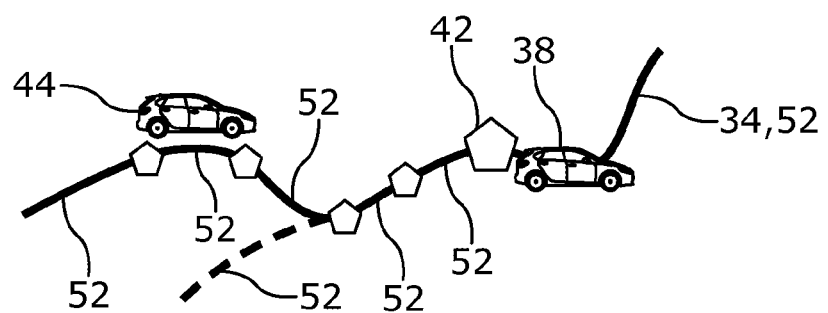
FIG. 5 shows a schematic overview for illustrating a third variant of the method DETAILED DESCRIPTION OF THE DRAWINGS

FIG. 5 shows a schematic overview for illustrating a third variant of the method. Here, too, the road network 34 is being travelled, for example, by the first fleet vehicle 38. The road network 34 is divided into a number of segments 52. In the present case, a high load event 42 was also detected on a certain segment 52 by the first fleet vehicle 38. As a result, a correspondingly increased classification number is assigned to the segments 52 that were driven by the first fleet vehicle 38 until reaching the event location of the high load event 42. This can also be done, for example, by the server 46. A segment 52 shown here dashed as an example, which was not travelled by the first fleet vehicle 38, thus gets no corresponding assigned classification number or its classification number for this segment 52 is not changed in response to the high load event 42. In this way, a classification number or probability is gradually learned for each of the segments 52, i.e. a measure wherein a high load event 42 occurs during or after driving the respective segment.

When the motor vehicle 44 is operated on the road network 34, it is then possible to determine at each position of the motor vehicle 44 on which of the segments 52 the motor vehicle 4 is currently moving and which classification number or probability is assigned to this segment 52. On the basis of this classification number or probability, it can then be determined which high load event 42 with what probability is relevant to the motor vehicle 44, if any.

The described variants of the method are only examples. In addition or alternatively, other variants or implementations of the described method or an idea underlying the method may be possible.

Irrespective of the specific variant of the method, vehicle-specific and/or driver-specific data or characteristics of the vehicles of the vehicle fleet 36 and/or the motor vehicle 44 may be taken into account as described. For example, if a charging of a traction battery has been determined as a high load event 42, then in order to determine whether this high load event 42 is relevant to the respective motor vehicle 44, the range that the motor vehicle 44 currently still has, the remaining range at which the driver of the motor vehicle 44 typically actuates a charging point—if applicable, depending on a type of road travelled or an available charging power, whether an assistance system of the motor vehicle 44 has issued a corresponding charging stop recommendation, what distance remains to a current destination of the motor vehicle 44 and/or the like are taken into account.

Overall, the examples described show how advantageously a thermal preconditioning can be realized based on an event radar, i.e. based on proactively determined relevant high load events 42, in order to enable particularly efficient and careful vehicle operation.

REFERENCE CHARACTER LIST

10 Process diagram
12 Input data
14 Map data
16 Fleet data
18 Vehicle data
20 Event determination
22 Strategy
24 Device
26 Vehicle components
28 Drive
30 High voltage system
32 Interior
34 Road network
36 Vehicle fleet
38 First fleet vehicle
40 Second fleet vehicle
42 High load event
44 Motor vehicle
46 Server
48 Route
50 Environment
52 Segments

What is claimed is:

1. A method for operating a motor vehicle, the method comprising:
providing a map of corresponding event locations for one or more high load events, wherein the one or more high load events have historically led to an above-average load on a vehicle component;
during a current operation of the motor vehicle:
determining a current position and/or route of the motor vehicle;
identifying a high load event from among the one or more high load events as likely to be relevant to the motor vehicle during the current operation, wherein the identification of the high load event is based on the current position and/or route of the motor vehicle; and
thermally preconditioning the vehicle component for the identified high load event, via a corresponding automatic control of at least one device of the motor vehicle, before the motor vehicle has reached the corresponding event location of the identified high load event,
wherein the thermal preconditioning prevents the temperature of the vehicle component from reaching an operation threshold during the identified high load event,
wherein each high load event is associated with an occurrence probability, and
wherein the thermal preconditioning for the identified high load event increases with the occurrence probability of the identified high load event reaching progressively greater thresholds.

2. The method of claim 1, wherein the map is generated based on fleet data recording the one or more high load events as detected by one or more fleet vehicles during operation.

3. The method of claim 2,
wherein the fleet data includes, for each high load event, the occurrence probability, and
wherein the occurrence probability: (a) reflects a proportion of the fleet vehicles having historically travelled through the corresponding event locations without occurrence of the high load event, and (b) is based on a recorded preceding driving history of the fleet vehicles travelling through the corresponding event locations.

4. The method of claim 1, further comprising:
generating the map, wherein generating the map includes, for each fleet vehicle:
detecting the high load event during the operation of the fleet vehicle,
recording a route segment travelled by the fleet vehicle prior to the occurrence of the high load event, and
assigning a distance-dependent classification number to the route segment in the map, the distance-dependent classification number characterizing the route segment as leading to the event location of the high load event;
wherein the identification of the high load event is based on the distance-dependent classification number.

5. The method of claim 4, wherein distinct distance-dependent classification numbers are assigned to the route segment for each corresponding high load event the route segment leads to.

6. The method of claim 1, further comprising:
ascertaining that an automatic navigation function is inactive during the operation of the motor vehicle; and
based on the ascertainment, identify a most-likely high load event from among a set of high load events whose corresponding event locations are within a given radius from the current position of the motor vehicle, wherein the most-likely high load event is the high load event that the motor vehicle is most likely to travel through,
wherein the thermal preconditioning of the vehicle component is based on the most-likely high load event.

7. The method of claim 1,
wherein the map is managed by a central server device external to the motor vehicle, and
wherein the identification of the high load event is further based on vehicle-specific data of the motor vehicle, including: state-of-charge, operating mode, component temperature, and/or technical equipment, managed by the motor vehicle independent of the central server device.

8. The method of claim 1, wherein the identification of the high load event is further based on driver-specific characteristics of a driver of the motor vehicle, including: type of driver and/or automatically learned behavior of the driver.

9. The method of claim 1, further comprising:
assigning each of the high load events to one of a plurality of classes according to one or more operating conditions of the vehicle during or directly preceding the high load events, wherein the operating conditions include: speed and/or a load of the motor vehicle, wherein each class of the plurality of classes is associated with a control measure; and
during the thermal preconditioning, automatically executing the control measure associated with the identified high load event.

10. A motor vehicle, comprising:
a navigation device configured to determine a current position and/or route of the motor vehicle;
a data interface configured to receive a map of corresponding event locations for one or more high load events, wherein the one or more high load events have historically led to an above-average load on a vehicle component;

a preconditioning device configured to precondition the vehicle component; and a control device configured to:
identify a high load event from among the one or more high load events as likely to be relevant to the motor vehicle during the current operation, where the identification of the high load event is based on the map and at least one of the current position and/or route of the motor vehicle; and thermally precondition the vehicle component for the identified high load event, via a corresponding automatic control of the preconditioning device, before the motor vehicle has reached the corresponding event location of the identified high load event, wherein the thermal preconditioning prevents the temperature of the vehicle component from reaching an operation threshold during the identified high load event, wherein each high load event is associated with an occurrence probability, and wherein the thermal preconditioning for the identified high load event increases with the occurrence probability of the identified high load event reaching progressively greater thresholds.

* * * * *